(12) United States Patent
Saleh et al.

(10) Patent No.: US 8,773,495 B2
(45) Date of Patent: Jul. 8, 2014

(54) INTEGRATED SYSTEM FOR TELEPRESENCE VIDEOCONFERENCING

(75) Inventors: Youssef Saleh, Arlington, MA (US); Gopal Paripally, North Andover, MA (US); Mark Duckworth, Merrimack, NH (US)

(73) Assignee: Polycom, Inc., San Jose, CA (US)

( * ) Notice: Subject to any disclaimer, the term of this patent is extended or adjusted under 35 U.S.C. 154(b) by 1178 days.

(21) Appl. No.: 12/249,467

(22) Filed: Oct. 10, 2008

(65) Prior Publication Data

US 2009/0096861 A1  Apr. 16, 2009

Related U.S. Application Data

(60) Provisional application No. 60/979,527, filed on Oct. 12, 2007.

(51) Int. Cl.
 *H04N 7/14* (2006.01)

(52) U.S. Cl.
 USPC .................................... 348/14.08; 348/14.09

(58) Field of Classification Search
 USPC .......................................... 348/14.08, 14.09
 See application file for complete search history.

(56) References Cited

U.S. PATENT DOCUMENTS

| | | | |
|---|---|---|---|
| 1,246,606 A | 11/1917 | Kane | |
| 3,635,174 A | 1/1972 | Ball | |
| 4,400,724 A | 8/1983 | Fields | |
| 4,516,156 A * | 5/1985 | Fabris et al. | 348/14.1 |
| 5,751,337 A | 5/1998 | Allen et al. | |
| 2004/0216647 A1 * | 11/2004 | Cvek | 108/50.02 |
| 2005/0024484 A1 | 2/2005 | Leonard et al. | |
| 2005/0185047 A1 | 8/2005 | Hii | |
| 2006/0082518 A1 | 4/2006 | Ram | |
| 2006/0104458 A1 | 5/2006 | Kenoyer | |
| 2006/0244817 A1 | 11/2006 | Harville | |
| 2006/0274031 A1 | 12/2006 | Yuen et al. | |
| 2007/0206091 A1 | 9/2007 | Dunn et al. | |
| 2007/0263081 A1 * | 11/2007 | De Beer et al. | 348/14.08 |
| 2012/0236108 A1 * | 9/2012 | Ferren et al. | 348/14.08 |

FOREIGN PATENT DOCUMENTS

| | | |
|---|---|---|
| CN | 1922544 A | 2/2007 |
| DE | 3317414 A1 | 11/1984 |
| WO | 2007/005752 A2 | 1/2007 |
| WO | 2007123946 A2 | 11/2007 |

OTHER PUBLICATIONS

International Search Report, Received in Corresponding PCT Application Nubmer PCT/US2008/079556 Dated Dec. 15, 2008.

(Continued)

*Primary Examiner* — Christopher M Brandt
(74) *Attorney, Agent, or Firm* — Wong, Cabello, Lutsch, Rutherford & Brucculeri, LLP.

(57) ABSTRACT

An integrated videoconferencing system has a credenza that houses three displays at predefined angles with respect to one another. A table positions in from the credenza for seating participants across from the credenza's displays. The table has three seating sections that are angled at another predefined angle with respect to one another. Three cameras are positioned in the top of the credenza, and each has a view angle directed perpendicularly at one of the seating sections. The table can also have a portion that interconnects with the credenza. In use, the integrated system allows the participants to conduct a telepresence videoconference in which the near-end participants can interact with the far-end participants as if they were all seated at the same conference table in the room together.

28 Claims, 5 Drawing Sheets

(56) References Cited

OTHER PUBLICATIONS

Examiner's First Report on Patent Application No. 2008310672, for corresponding Australian case, dated Dec. 16, 2010.
Chinese Office Action and Search Report in counterpart Chinese Appl. No. 200880117712.4, dated Oct. 15, 2012.
Search Report in counterpart EP Appl. 08837845.0, dated Jul. 19, 2013.
First Examination Report in counterpart Austrailian Appl. 2012216821, dated Aug. 15, 2013.
Chinese Office Action and Search Report in counterpart Chinese Appl. No. 200880117712.4, dated Aug. 9, 2013.
Communication in counterpart European Appl. 08 837 845.0-1905, dated Mar. 11, 2014.

\* cited by examiner

INTEGRATED SYSTEM FOR TELEPRESENCE VIDEOCONFERENCING

CROSS-REFERENCE TO RELATED APPLICATIONS

This is a non-provisional of U.S. Provisional Application Ser. No. 60/979,527, filed 12 Oct. 2007, to which priority is claimed and which is incorporated herein by reference in its entirety.

BACKGROUND

Organizations use videoconferencing systems to conduct meetings. Some rudimentary videoconferencing systems include one or two screens and videoconferencing equipment. However, organizations continually desire to make videoconferences more interactive and effective. One way to achieve interactive videoconferences involves building a meeting room equipped with specifically designed displays and tables. This type of videoconferencing system requires a great deal of space and capital investment to build. Examples of this type of videoconferencing system include the Polycom® RealPresence™ Experience High Definition (RPX™ HD) system. In the RPX™ HD systems, for example, a specially designed suite to accommodate anywhere from 4 to 28 participants is constructed. The custom suite is fitted with specific furniture, chairs, a ceiling cloud of acoustic baffling, studio lighting, a sound paneling back wall, videoconferencing equipment, ceiling microphones, and a full-screen video display (8'×42" or 16'×42").

What is needed is a system for videoconferencing that is more interactive and effective than existing system but that does not require a specifically designed suite.

DETAILED DESCRIPTION

Figure 1:
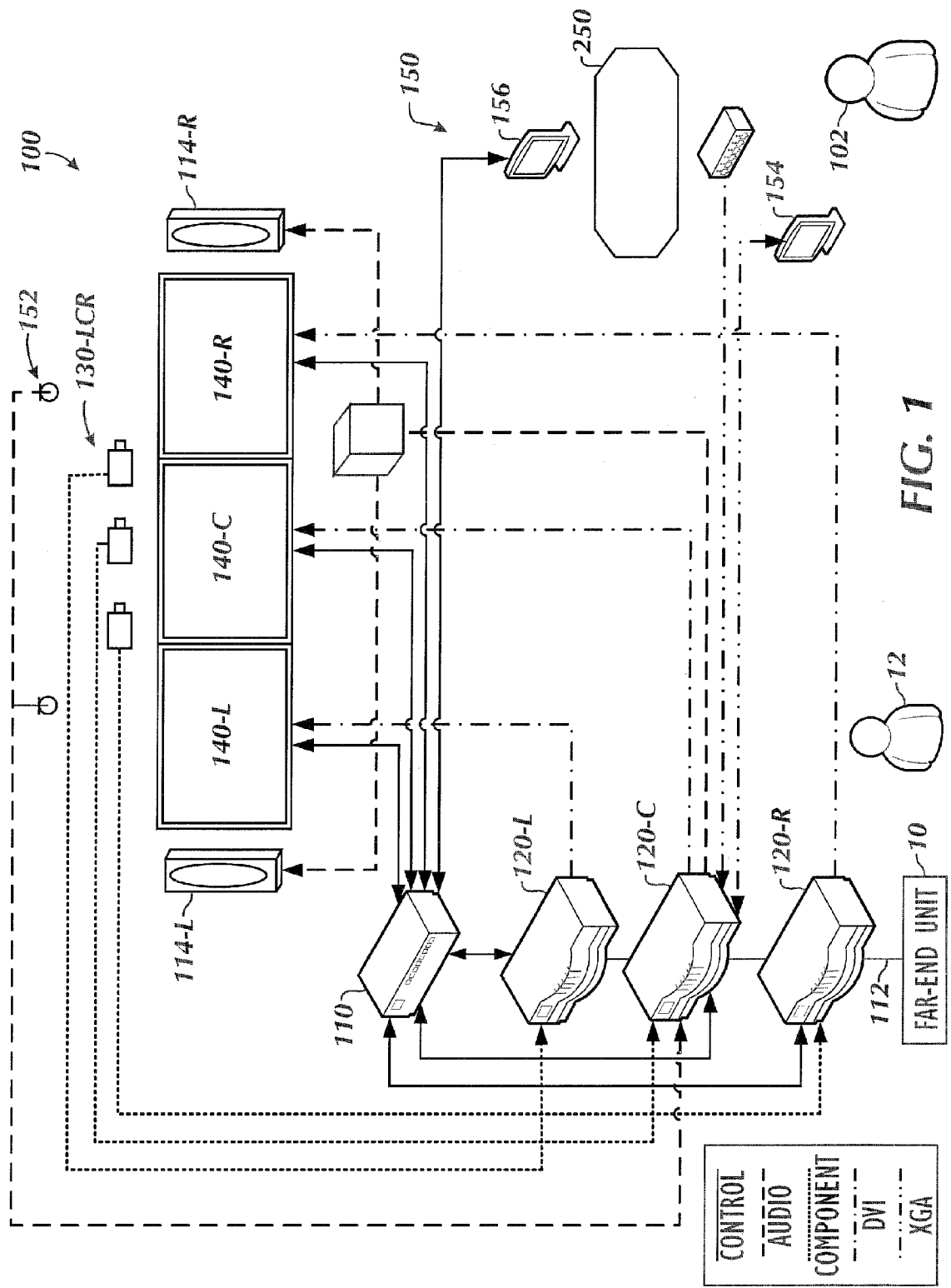
FIG. 1 illustrates a diagram of an integrated videoconferencing system.

An integrated videoconferencing system 100 schematically shown in FIG. 1 includes a control unit 110, three codecs 120-LCR (Left (L), Center (C), and Right (R)), three camera units 130-LCR, and three displays 140-LCR. The system 100 also includes additional audio/visual (A/V) equipment and near-end components 150, such as speakers 114, microphones 152, content displays 154, and a control panel 156. The microphones 152 can be ceiling mounted or table mounted microphones. One content display 154 can be provided for every two participants at a table 250, and the control panel 156 can provide an interface for a user to control the system 100 and can have a touch screen.

The central codec 120-C is the primary codec and is coupled to the microphones 152 and the sound system's speakers 114-LR via audio lines. This primary codec 120-C is also coupled to content displays 154 and laptop and content inputs via XGA and audio lines. Each of the codecs 120-LCR is respectively coupled to one of the camera units 130-LCR via a component line. Each of these camera units 130-LCR can be a Polycom EagleEye. The codecs 120-LCR are also respectively coupled to one of the displays 140 via a DVI line.

The codecs 120-LCR, which can be Polycom HDX 9004's, include conventional videoconferencing components to conduct a videoconference between near-end participants 102 with one or more far-end units 10 having far-end participants 12 via a communication connection 112. These videoconferencing components are known and used in the art and are not described in detail herein.

The control unit 110 is coupled to each of the codecs 120-LCR, to a control panel 156, and the displays 140 via control lines to control operation of the system 100. The control unit 110 can also include a computer to co-ordinate the A/V system and networking.

Figure 2A:
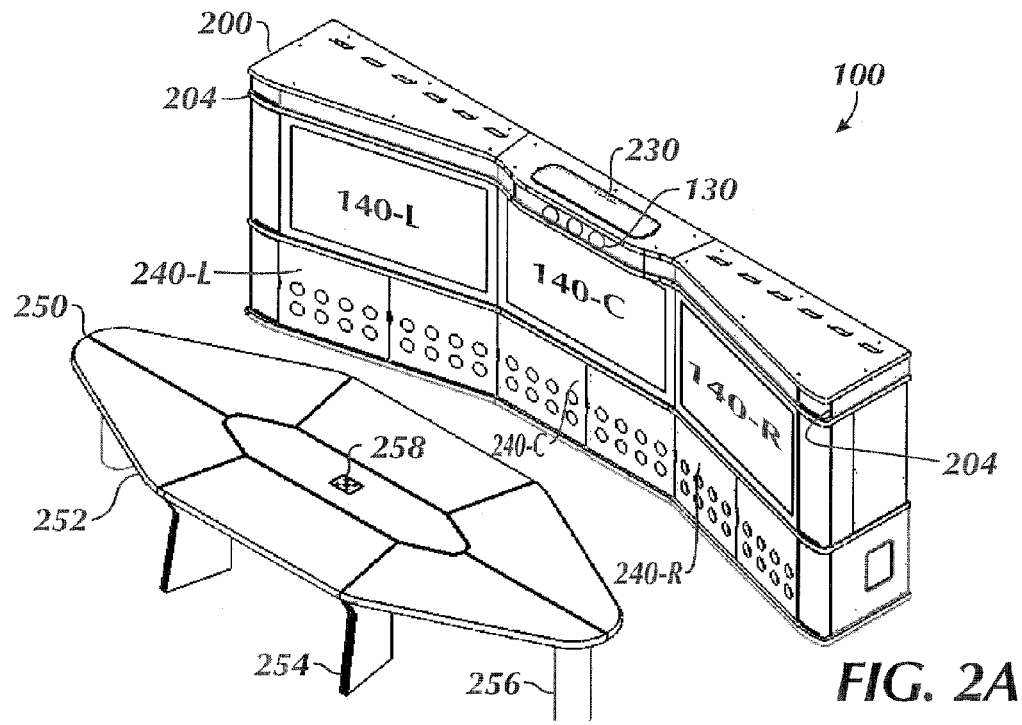
FIGS. 2A-2B illustrate perspective and top views of the integrated videoconferencing system.
Figure 2B:
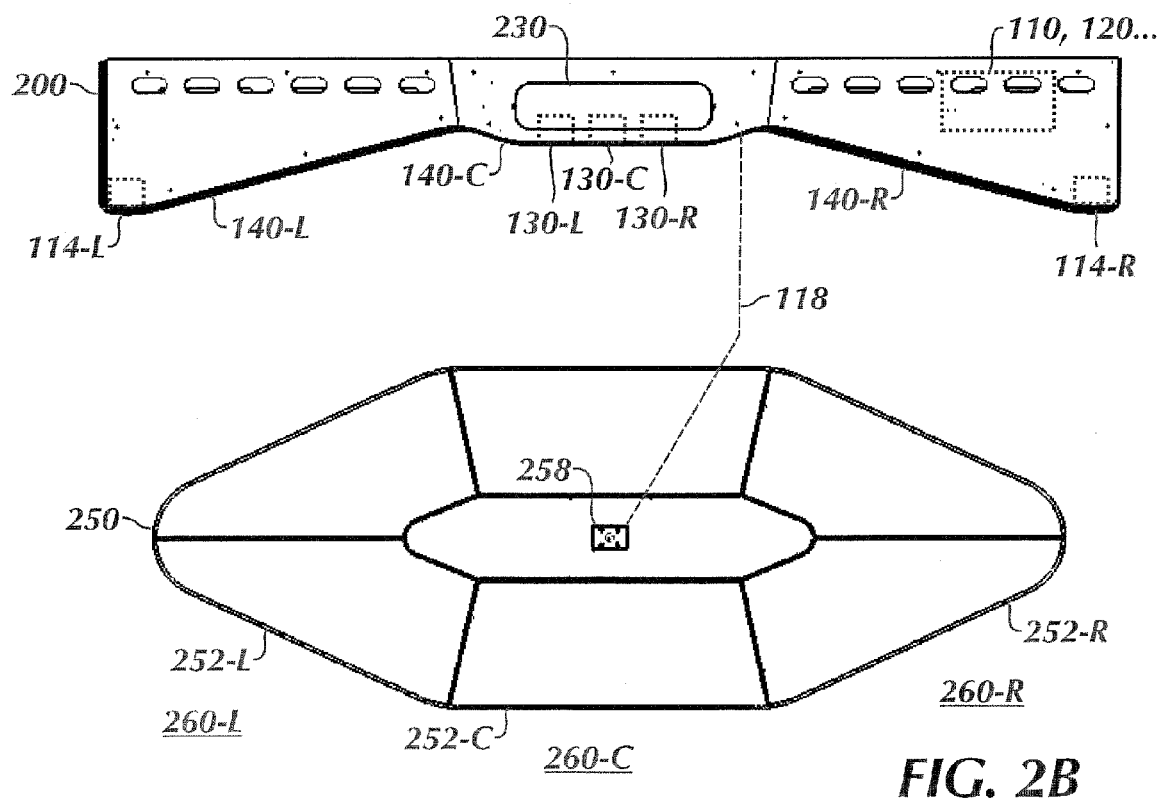

The control unit 110, codecs 120, camera units 130, and displays 140 are all integrated into a furniture housing or credenza 200 as shown in FIGS. 2A-2B. In addition, near-end components (150; FIG. 1) can be integrated into a table 250 associated with the credenza 200. The arrangement of components in the credenza 200 and the seating of participants at the table 250 are interrelated to enhance the telepresence effect during a videoconference so that the near-end participants have the sense that the far-end participants are in the same room with them and seated at the same table.

As shown in FIGS. 2A-2B, the credenza 200 houses most of the system's electronic components. For example, the credenza 200 houses the three camera units 130-LCR, the three displays 140-LCR, two speakers 114-LR, and other equipment (e.g., control unit 110, codecs 120, etc.). Because it is integrated, the credenza 200 allows the system 100 to be set up in an office space or room that may not readily be suited to accommodate these videoconferencing components and that will not need to be specifically designed to accommodate such components as is currently done in the art.

As shown, the credenza unit 200 has three angled front faces 240-LCR that hold the three displays 140-LCR. Upper edge spaces 204 house speaker units 114-LR. The displays 140-LCR and speakers 114-LR can mount in the credenza 200 with brackets, and the top of the credenza 200 can have ventilation slots for air circulation. An upper central space 230 on the credenza 200 above the central display 140-C houses the three camera units 130-LCR, which are directed at predetermined orientations from the credenza's front as discussed below.

As a further feature of the integrated nature of the system, the near-end components (150; FIG. 1) can be integrated into the table 250 also shown in FIGS. 2A-2B. One or more cables 118 connect the control unit 110 and other components in the credenza 200 with near-end components (150) on the table 250, such as microphones, content display, and control panel. For example, the control panel can mount on a cable cubby block 258 on the table 250 connected to the cable 118. Alternatively, one or more of the near-end components 150 can be wirelessly connected to the components in the credenza 200 to eliminate the use of cables 118.

The table 250 in this embodiment is independent of the credenza 200 and can accommodate up to six participants at three seating areas 260-LCR as best shown in FIG. 2B. In particular, the table 250 has a hexagonal shape, and three sides 252-LCR along the table's back edge position away from the front panels 240-LCR of the credenza 200 and provide the three seating area 260-LCR for near-end participants. These seating areas 260-LCR may each span a width of about 53-inches accommodating two participations each. As best shown in FIG. 2A, the table legs 254 and 256 are designed to ensure good ergonomics.

Figure 3:
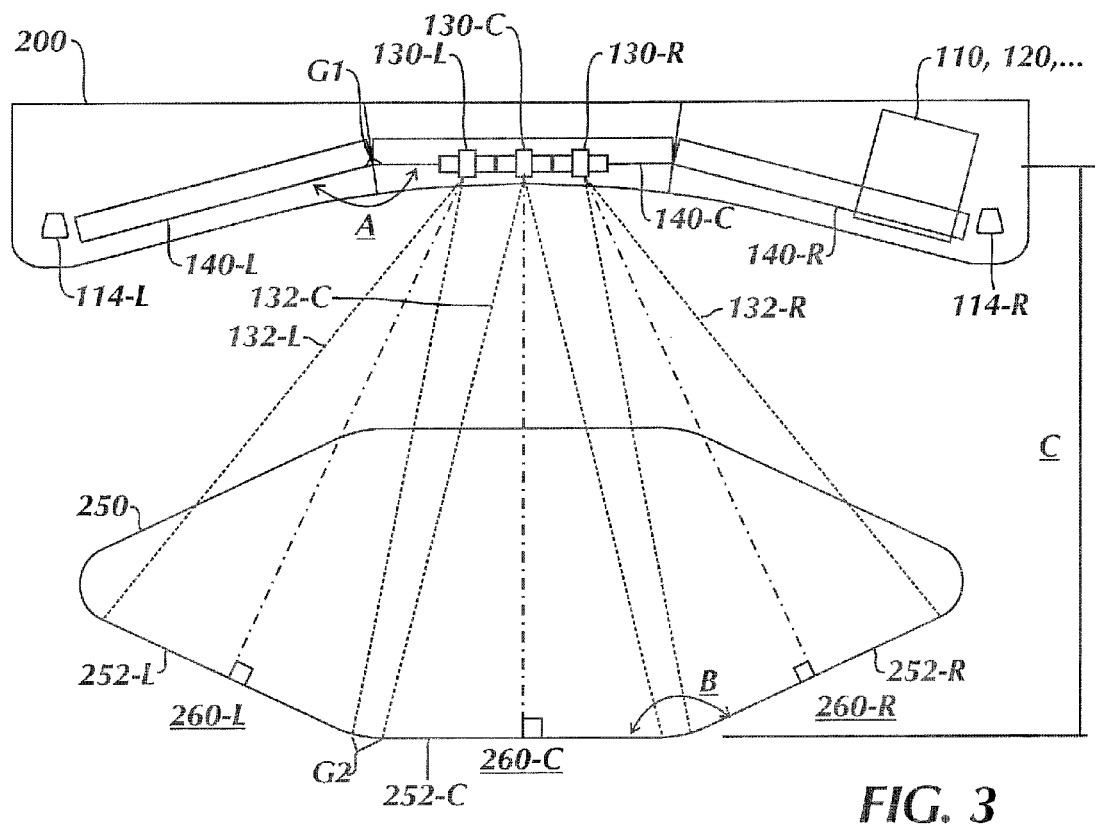
FIG. 3 illustrates a schematic plan view of the integrated videoconferencing system.

As noted above, the credenza 200 and the table 250 have an interrelated arrangement to enhance the telepresence effect during a videoconferece. To achieve this, the credenza 200 and the table 250 as best shown in FIG. 3 have a predefined arrangement of camera units 130-LCR, displays 140-LCR, and seating areas 260-LCR. This predefined arrangement involves defined display angles, camera locations, viewing angles, table distance, table shape, and chair height and width that enhance a videoconferencing session by giving all participants a feeling as though they are all in the same room and sharing the same meeting table.

For example, the three camera units 130-LCR mount atop the central display 140-C, which can optimize potential eye contact between near-end and far-end participants and enhance the telepresence effect. When a near-end participant is interacting with a far-end participant, for example, the potential for eye contact is best when the camera unit 130-LCR is close to the viewable image of the far-end participant on the display 140-LCR. Therefore, the multiple camera units 130-LCR are positioned in the credenza 200 near the center display 140-C due to the increased likelihood that far-end participants will be presented on the center display 140-C, which would be the case for a point-to-point call with the far-end participants seated at the center of their table.

The shape of the table 250 is designed to provide an illusion to the near-end participants that the far-end participants are sitting in the same room as the near-end participants. In addition, the three displays 140-LCR, which may be High Definition (HD), provide life size images of the far-end participants at other sites. To achieve this, the displays 140-LCR are flat panel displays having a 16:9 aspect ratio and having a 60-inch diagonal measurement. With these dimensions, the displays 140-LCR each offer about 53-inches of viewable width, which corresponds roughly to the width that two people will span when sitting side by side at a conference table. Thus, when a far-end camera captures video of two far-end participants sitting side-by-side, their image can be displayed as life size on the displays' 53-inch viewable widths.

In addition to the above features, the predefined arrangement involves defined angles between the displays 140-LCR, camera units 130-LCR, and seating areas 260-LCR. In general, the curvature and angling of the table 250 corresponds to the curvature of the displays 140-LCR as well as the angling of the camera views 132-LCR so that the table 250 appears coherent across displays as viewed at the far-end. In particular, the two side displays 140-LR are angled inward relative to the central display 140-C by a predefined angle A. The three sides 252-LCR of the table's back edge are angled relative to one another with a predefined angle B, and the table 250 is positioned a defined distance C from the credenza 200. Here, the angle A between the displays 140-LCR is about 165-degrees, and the angle B between the sides 252-LCR is about 155-degrees, which is about 94% of the display's angle A. In addition, the table's back side 252-C is positioned about 110-inches from the position of the camera units 130-LCR. (As an added benefit, the distance C can also account for additional participants along the front edge of the table 250 if the table is to be used for such a function during a face-to-face conference.)

The camera units 130-LCR are centrally arranged on the credenza 200, and each camera unit 130-LCR has a view angle 132-LCR directed at one of the seating positions 260-LCR on the table's back sides 252-LCR. In particular, the central camera unit 130-C has a view angle 132-C with a centerline directed perpendicular to the central seating position's side 252-C. Likewise, side camera units 130-LR each have view angles 132-LR with centerlines directed perpendicular to the adjoining table sides 252-LR. In other words, the centerlines of the two side view angles 132-LR may be angled about 25-degrees from the centerline of the center view angle 132-C, although this depends on the distance of the camera units 130-LCR from the table's back side 252-C and the distance that the camera units 130-LCR are apart from one another (e.g., about 10-inches in the present embodiment). Either way, the arrangement of back sides 252-LCR and camera view angles 132-LCR enables each camera unit 130-LCR to capture a front-on view of the participants at the seating positions 260-LCR and to send video of the front-on views to far-end units during a videoconference.

In addition, the camera units 130-LCR are positioned side by side as close to the front of a top cove in the credenza 200 as possible. This will allow for maximum participant viewing in different modes (i.e., the center camera 130-C can be used to view the entire table if zoomed out or each camera 130-LCR can be used to view only its corresponding seating section 260-LCR of the table 250). Due to the downward angle at which the camera units 130-LCR must tilt to view the seated participants, the face of the cameras in the units 130-LCR preferably rest as far forward as possible so that their views are not obstructed by portions of the credenza 200.

As also shown in FIG. 3, gaps G1 between the displays 140-LCR's viewable areas are intended to match gaps G2 between the view angles 132-LCR directed at the table sections 260-LCR. For example, there are gaps G2 between the camera view angles 132-LC of the seating areas 260-LC and again between the camera view angles 132-CR of the seating areas 260-CR. These gaps G2 match with the gaps G1 between the viewable areas of the displays 140-LCR caused by the bezel around the active display areas of the displays 140-LCR.

These matching gaps G1/G2 give a natural appearance when an object in one camera view crosses a camera boundary into another camera view. For example, if a person in the leftmost seating area 260-C reaches across the boundary with her left hand to pick up an item on the table 250 in front of the adjacent seating area 260-L, her arm will be split across the field of view of two camera units 130-LC. The resulting image of her arm, however, will appear split across two displays at the far-end, but will look reasonably natural in its overall length without obvious distortions because of the matching between gaps G2 in the near-end camera views and the gaps G1 in far-end displays.

Each camera unit 130-LCR, when in it's normal position to view two people seated at the table 250, has the same relative view of two people as each of the other camera units 130-LCR. As shown in FIG. 3, the shape of the table 250 and the location of the camera units 130-LCR are designed to provide this same relative view for all three sections 260-LCR. In this way, the distance from each camera unit 130-LCR to its corresponding table sides 252-LCR is roughly the same for all camera units 130-LCR. Moreover, the centerlines of the camera views 132-LCR are perpendicular to the corresponding table sides 252-LCR. As a result, when images from these camera units 130-LCR are shown on the displays of a far-end, a smooth, natural image of all the participants is produced. The multiple displayed images, therefore, appear to fit together naturally, showing all the participants seated at a continuous (straight) table (See e.g., FIG. 4).

Figure 4:
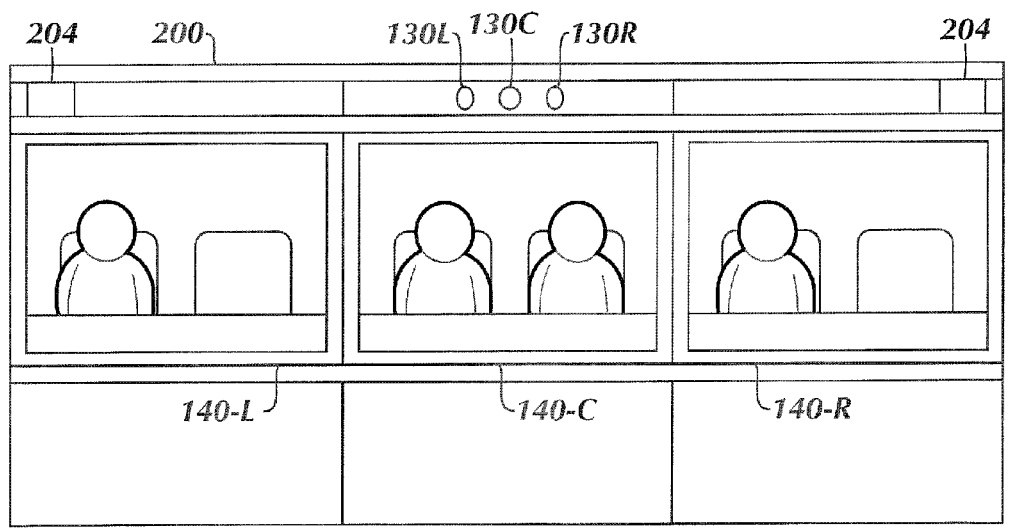
FIG. 4 illustrates a frontal view the integrated videoconferencing system.

The geometrical relationship between the camera units 130-LCR, the table sides 252-LCR, and the displays 140-LCR also removes what is commonly known as a "butterfly effect" that can occur when more than one screen is used for a videoconference. In the butterfly effect, portions of the images at the outermost sides of the viewing area appear distorted or skewed upward from the central portion of the viewing area. This butterfly effect, therefore, undesirably distorts the perspective of the images being viewed. The integrated system reduces or eliminates this effect by making the viewed image appear to have a more natural perspective to the participants. For example, FIG. 4 show displays 140-LCR having video content that when viewed by participants at the table (250) will lack the unwanted butterfly effect that would typically result in a prior art videoconferencing system.

Figure 5A:
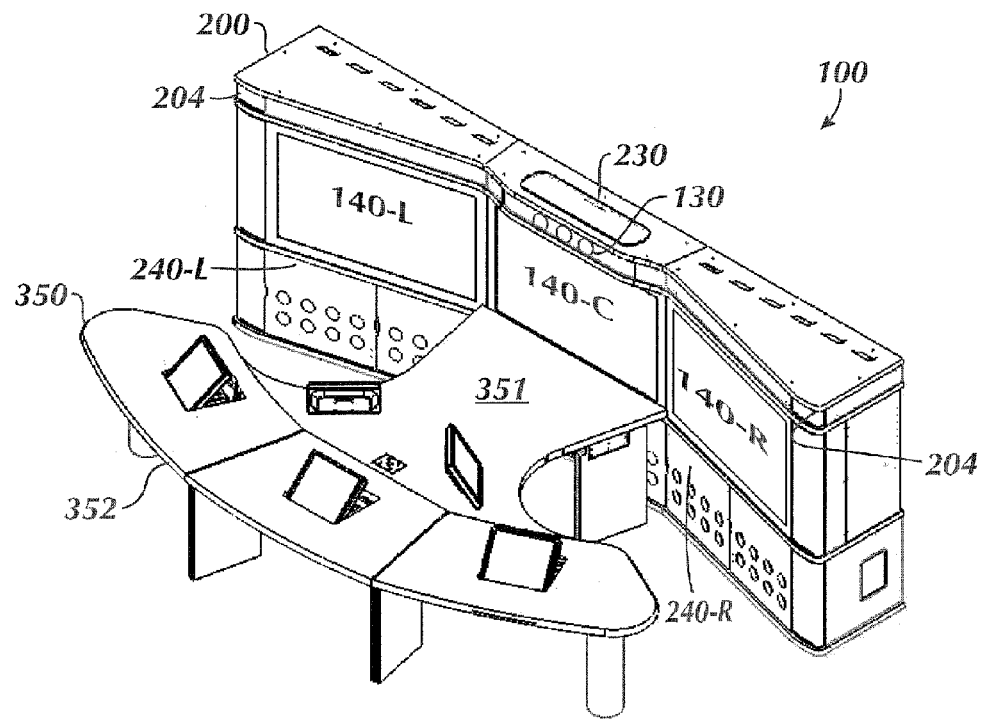
FIGS. 5A-5B illustrate perspective and top views of another integrated videoconferencing system.
Figure 5B:
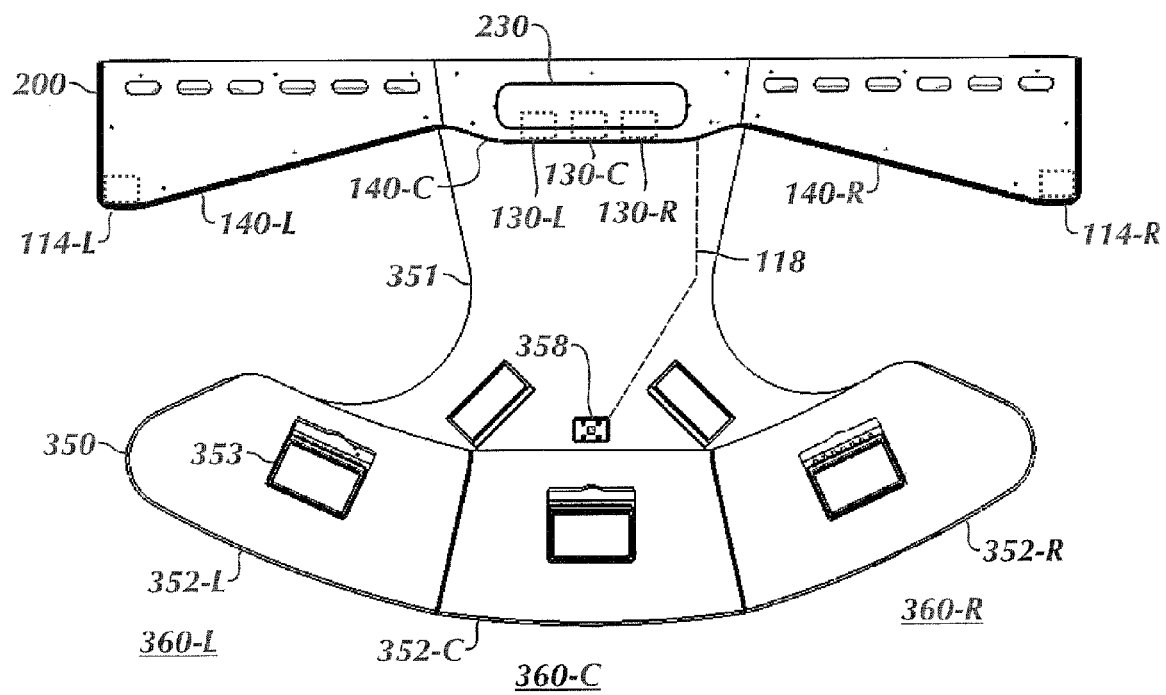

Another embodiment of the integrated videoconferencing system 100 shown in FIGS. 5A-5B has many of the same components as described previously. In this arrangement, an integrated table 350 for near-end participants is linked to the credenza 200 as opposed to being an independent table 250 as in FIGS. 2A-2B. As best shown in FIG. 5B, the integrated table 300 has a portion 351 interconnecting the table 350 to the credenza 200. This interconnecting table portion 351 not only links the table 350 to the credenza 200 enhancing the interconnectedness of participants and helps to hide cables 118 run between the credenza 200 and the table's components, but the table portion 351 fixes the table 350 at the predefined distance from the front of the credenza 200. In addition, the interconnecting table portion 351 can house a cable cubby block 358 for connections to a remote control unit and other equipment.

The table 350 itself includes embedded content monitors 353 for each seating area 360-LCR. The table 350 can also contain power, network, and VGA/Audio connectivity for laptop integration and can house table microphones if necessary. Furthermore, two content displays can be incorporated into the interconnecting table portion 351 allowing the table to be used as a conferencing table for additional persons when not used for videoconferencing at the time.

As with the previous embodiment, the integrated table 350 has a back edge with three sides 352-LCR for three seating areas 360-LCR, and the geometry of the table 350 along with the arrangement of displays 140-LCR and camera units 130-LCR in the system provides an illusion that the far-end participants are in the same room with the near-end participants, but even more so due to the interconnecting portion 351. Thus, the same geometrical relationships discussed previously with respect to the embodiment of FIGS. 1-4 also apply to the system of FIGS. 5A-5B.

The integrated videoconferencing system in the embodiments of FIGS. 1-5B include three displays, three cameras, and three seating areas. Other embodiments of the system can have more than three displays, cameras, and seating areas. For example, the integrated videoconferencing system illustrated in FIG. 6 has a credenza 400 with four displays 440 (Left (L), Right (R), Center Right (CR), and Center Left (CL)), and four camera units 430 are positioned at the top of the credenza 400 at about its center. A table 450 positions across from the camera units 430 and has four sides 452 for seating positions 460 of two participants each. An interconnecting table portion 451 also connects the table 450 to the credenza 400.

Figure 6:
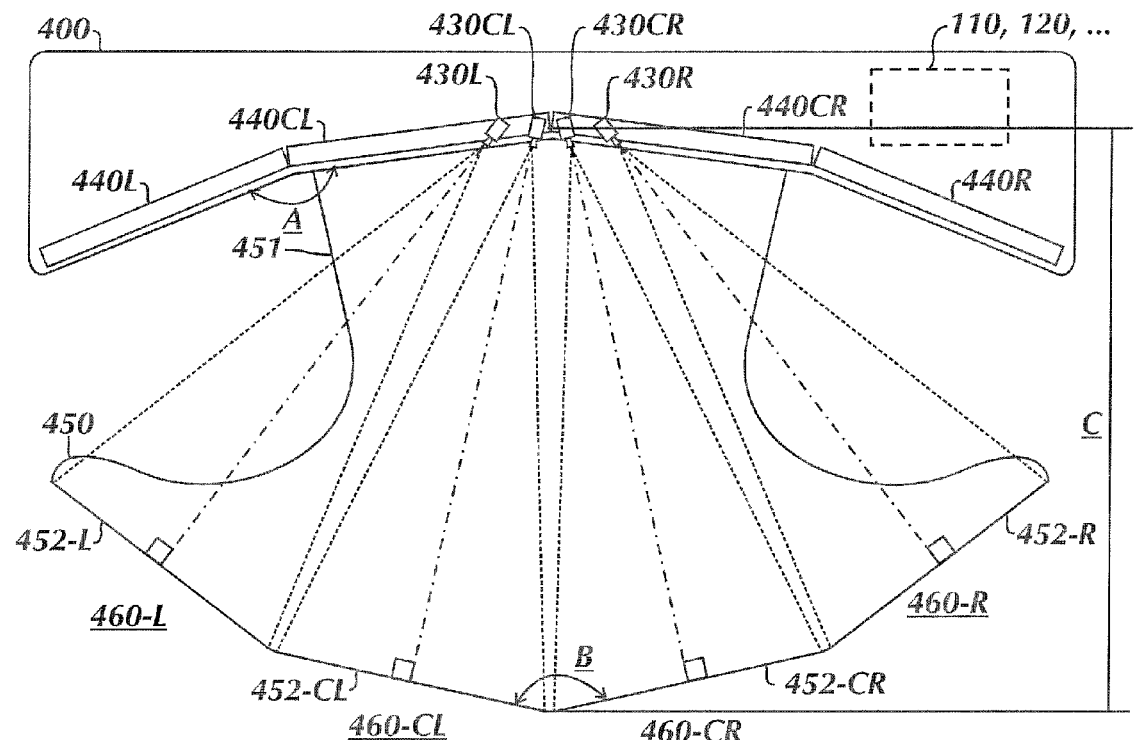
FIG. 6 illustrates a plan view of an integrated videoconferencing system having four displays, four cameras, and four seating areas.

As with previous embodiments, the integrated system of FIG. 6 also has a predefined arrangement between the displays 440, camera units 430, and seating areas 460 and has other features discussed previously that enhance the telepresence effect for the integrated system. For example, each of the displays 440 is oriented relative to one another by a first predefined angle A, and each of the table's sides 452 is oriented relative to one another by a second predefined angle B. Likewise, each of the camera units 430 has a view angle that is directed perpendicular to one of the sides 452 of the table 450 so that the camera units 430 can capture face-on views of the participants at the various seating positions 460.

In the present example, the predefined angle A of the displays 440 is again about 165-degrees, and the predefined angle B for the seating positions 460 is about 155-degrees, although other angular relationships could be used. For example, the display angle A could be decreased to about 155-degrees, and the angle B could be reduced to about 145 or 146-degrees (roughly 94% of angle A) due to the overall increased width of the integrated system in FIG. 6. The distance C between the table's back sides 252 and the location of the camera units 430 may be about 110-inches, but may be greater due to the overall increased width of the integrated system. The angular orientations of the camera units 430 that allows them to point perpendicularly to the table's back sides 252 depends on the distances between the camera units 430 and their distance from the table's back sides 252.

As an alternative to mounting the camera units 430 centrally in the credenza 400 above the displays 440, the camera units 430 in this and other embodiments can be positioned in other areas. For example, camera units can be embedded between the active areas of adjacent displays 440. For example, these camera units, which may be smaller units, can be embedded between displays 440CL and 440CR in FIG. 6. Moreover, these camera units can be positioned at eye level to enhance the potential for eye contact.

Figure 7:
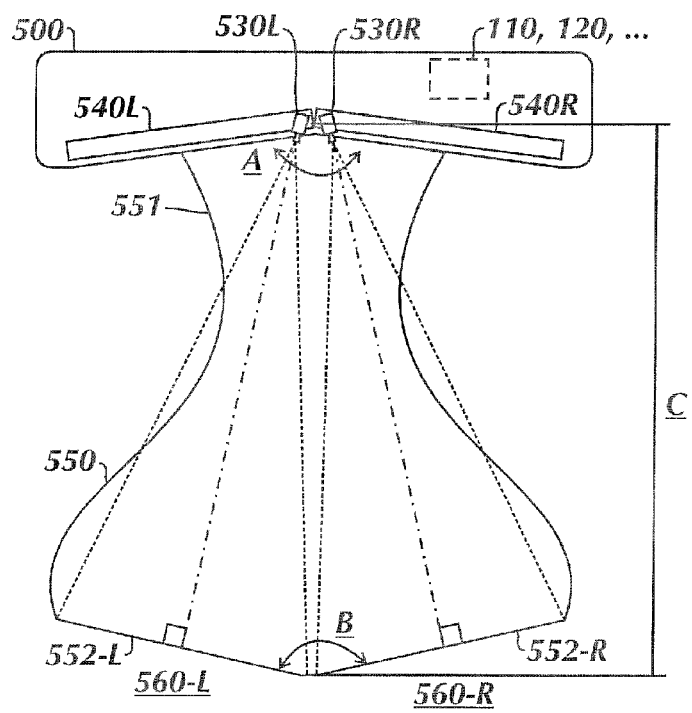
FIG. 7 illustrates a plan view of an integrated videoconferencing system having two displays, two cameras, and two seating areas.

In line with previous embodiments, FIG. 7 shows a schematic plan view of an integrated videoconferencing system having a credenza 500 housing two camera units 530 and two displays 540 as well as the control unit 110, codecs 120, and other equipment. This system also has a table 550 having an interconnected portion 551 to the credenza 500 and having two seating areas 560 for two participants each. In this system, the predefined arrangement of the camera units 530, displays 540, and seating areas 560 are also interrelated as before to enhance the telepresence effect during a videoconference.

In each of the embodiments disclosed herein, the various angles and distances are given as approximations and can be adjusted according to acceptable tolerances. For example, the predefined angle A between the displays 140-LCR in FIG. 3 is about 165-degrees, but it will be appreciated that the angle in an actual implementation can vary by plus or minus several degrees while still achieving the overall result. Moreover, the various angles and distances provided depend upon the overall size of the displays, credenza, table, etc. and will vary for a given implementation having different sizes. In general, the angle A between the displays (e.g., 140-LCR in FIG. 3) may preferably be either equal to or greater than the angle B between the table's sides (e.g., 252-LCR in FIG. 3).

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An integrated videoconferencing system, comprising:
a housing having a central display and two side displays and having a central camera and two side cameras;
a table opposing the housing and having first and second edges and first and second ends, the first and second ends disconnected from the housing, the first edge positioned toward the housing, the second edge positioned away from the housing, the second edge having a central side and two adjoining sides, the central side aligned with the central display at a predefined distance, the two adjoining sides angled inward on either side of the central side by a first predefined angle; and
an interconnecting table portion disposed between the first and second ends of the table, the interconnecting table portion connected at a proximal end to a central portion of the first edge of the table and connected at a distal end to an opposing central portion of the housing, the interconnecting table portion bridging a space between the central portion of the table and the central portion of the housing and maintaining the central side of the second edge at the predefined distance,
wherein the central camera has a view angle directable perpendicular to the central side; and
wherein each of the two side cameras disposed on either side of the central camera has a view angle directable perpendicular to one of the adjoining sides.

2. The system of claim 1, wherein each of the two side displays are angled inward on either side of the central display by a second predefined angle.

3. The system of claim 1, wherein each of the central and two adjoining sides of the second edge of the table accommodates two participants.

4. The system of claim 2, wherein the second predefined angle is at least equal to or greater than the first predefined angle.

5. The system of claim 2, wherein the second predefined angle is approximately 165-degrees.

6. The system of claim 5, wherein the first predefined angle is approximately 155-degrees.

7. The system of claim 6, wherein the predefined distance is about 110 inches.

8. The system of claim 1, wherein each of the central and two adjoining sides of the second edge of the table spans approximately 53-inches.

9. The system of claim 1, wherein the adjacent view angles of the cameras have first gaps, and wherein viewable areas of the adjacent displays have second gaps corresponding to the first gaps.

10. The system of claim 1, wherein the interconnecting table portion of the table hides one or more cables interconnecting an electronic component of the housing with an electronic component of the table.

11. The system of claim 1, further comprising at least two speakers positioned on either side of the housing.

12. The system of claim 1, further comprising videoconferencing equipment housed in the housing and coupled to the displays and the cameras.

13. The system of claim 12, further comprising electronic equipment integrated into the table and coupleable to the videoconferencing equipment in the housing.

14. An integrated videoconferencing system, comprising:
a housing having a plurality of displays and having a plurality of cameras;
a table opposing the housing and having first and second edges and first and second ends, the first and second ends disconnected from the housing, the first edge positioned toward the housing, a portion of the second edge positioned away from the housing at a predefined distance, the second edge having a plurality of sides corresponding to the number of displays, each of the sides oriented relative to one another by a first predefined angle; and
an interconnecting table portion disposed between the first and second ends of the table, the interconnecting table portion connected at a proximal end to a central portion of the first edge of the table and connected at a distal end to an opposing central portion of the housing, the interconnecting table portion bridging a space between the central portion of the table and the opposing central portion of the housing and maintaining the portion of the second edge at the predefined distance;
wherein each of the plurality of cameras has a view angle predetermined to be perpendicular to one of the sides of the table.

15. The system of claim 14, wherein the adjacent view angles of the cameras have first gaps, and wherein viewable areas of the adjacent displays have second gaps corresponding to the first gaps.

16. The system of claim 14, further comprising videoconferencing equipment housed in the housing and coupled to the displays and the cameras.

17. The system of claim 16, further comprising electronic equipment integrated into the table and coupleable to the videoconferencing equipment in the housing.

18. The system of claim 14, wherein each of the displays is oriented relative to one another by a second predefined angle.

19. The system of claim 18, wherein the second predefined angle is at least equal to or greater than the first predefined angle.

20. The system of claim 18, wherein the second predefined angle is approximately 165-degrees.

21. The system of claim 20, wherein the first predefined angle is approximately 155-degrees.

22. The system of claim 14, wherein the interconnecting table portion of the table hides one or more cables interconnecting an electronic component of the housing with an electronic component of the table.

23. The system of claim 14, wherein each of the sides of the second edge of the table accommodates two participants.

24. An integrated videoconferencing system, comprising:
a housing;
a plurality of displays disposed on a front of the housing and including—
a central display,
a first display disposed on a first side of the central display, and
a second display disposed on a second side of the central display;
a plurality of cameras disposed on the housing above the central display, the cameras including—
a central camera having a central view angle,
a first camera disposed on a first side of the central camera and having a first view angle, and
a second camera disposed on a second side of the central camera and having a second view angle;
a table interconnected to the housing and extending away from the front of the housing, the table including—
a central member of the table connected at a proximal end to a central portion of the table and connected at a distal end to an opposing central portion of the housing, the interconnecting table portion bridging a space between the central portion of the table and the opposing central portion of the housing;

first and second ends disposed on either side of the central member and disconnected from the housing, a central edge aligned with the central display at a predefined distance, the central view angle of the central camera being alignable perpendicularly to the central edge, a first edge angled inward on a first side of the central edge by a first predefined angle, the first view angle of the first camera being alignable perpendicularly to the first edge, and a second edge angled inward on a second side of the central edge by the first predefined angle, the second view angle of the second camera being alignable perpendicularly to the second edge; and videoconferencing equipment coupled to the displays and the cameras.

25. The system of claim 24, wherein viewable areas between the displays have first gaps on the first and second sides of the central display, and wherein the view angles of the cameras have second gaps corresponding to the first gaps.

26. The system of claim 24, further comprising electronic equipment integrated into the table and coupleable to the videoconferencing equipment.

27. The system of claim 24, wherein the housing comprises a credenza housing the videoconferencing equipment.

28. The system of claim 24, wherein each of the central, first, and second edges of the table accommodates two participants.

* * * * *

UNITED STATES PATENT AND TRADEMARK OFFICE
CERTIFICATE OF CORRECTION

| | | |
|---|---|---|
| PATENT NO. | : 8,773,495 B2 | Page 1 of 1 |
| APPLICATION NO. | : 12/249467 | |
| DATED | : July 8, 2014 | |
| INVENTOR(S) | : Saleh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1309 days.

Signed and Sealed this
Fourth Day of August, 2015

Michelle K. Lee
*Director of the United States Patent and Trademark Office*